B. J. FREDERICK.
STRAINER FOR MILK PAILS.
APPLICATION FILED JUNE 29, 1912.
1,053,023.
Patented Feb. 11, 1913.
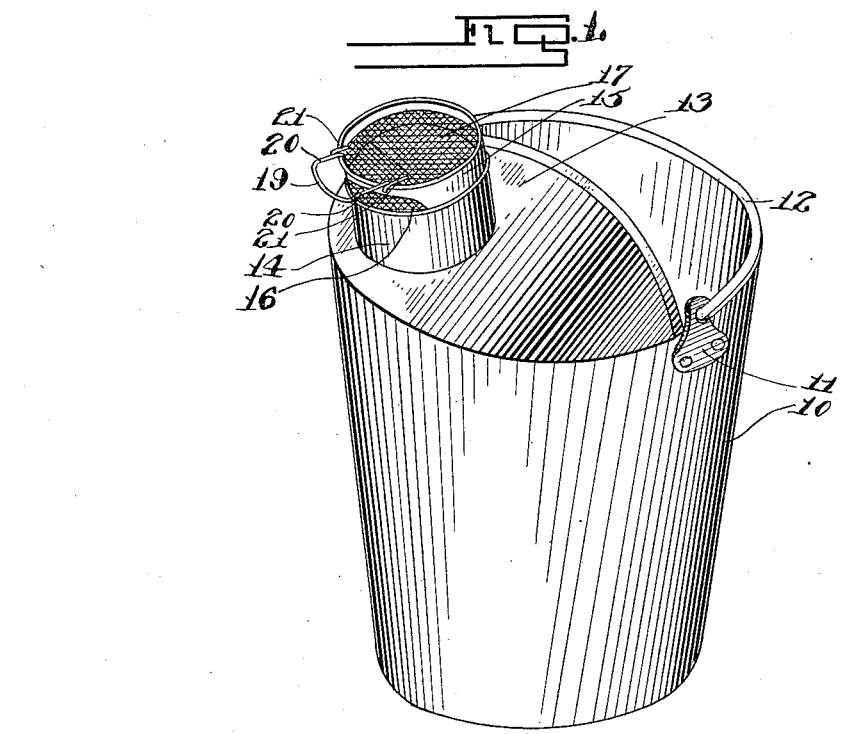
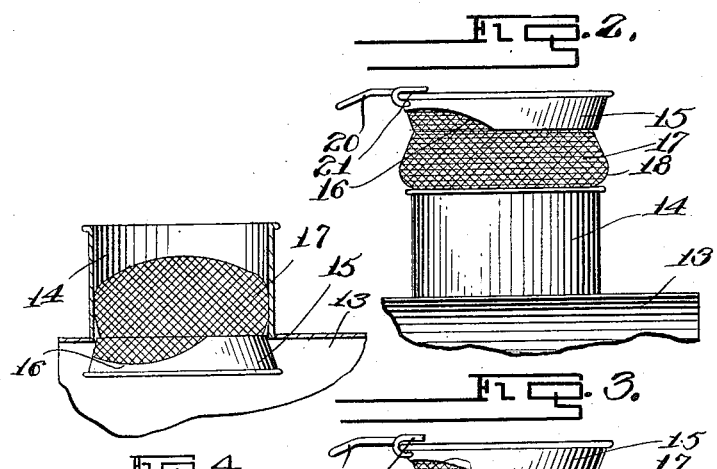
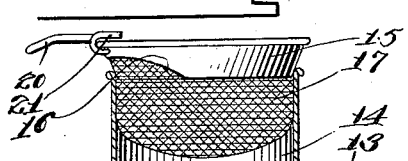
WITNESSES
INVENTOR
Benjamin J. Frederick.
his Attorney.

UNITED STATES PATENT OFFICE.

BENJAMIN J. FREDERICK, OF ERIE, NORTH DAKOTA.

STRAINER FOR MILK-PAILS.

1,053,023.  Specification of Letters Patent.  Patented Feb. 11, 1913.

Application filed June 29, 1912. Serial No. 706,691.

*To all whom it may concern:*

Be it known that I, BENJAMIN J. FREDERICK, a citizen of the United States, residing at Erie, in the county of Cass and State of North Dakota, have invented certain new and useful Improvements in Strainers for Milk-Pails, of which the following is a specification, reference being had therein to the accompanying drawing.

This invention relates to milking pails, and the principal object of the invention is to provide a pail with an improved type of strainer which is connected with the pail so that when finished milking, the milk may be poured through the strainer to clean the milk.

Another object of the invention is to provide a strainer which is so constructed that it will be held in the spout of the pail by frictional engagement, this frictional engagement being provided by the fabric portion of the strainer.

Another object of the invention is to so construct the strainer that the milk may be thoroughly drained out of the pail, thereby doing away with the danger of any of it remaining in the pail, and not passing out through the strainer.

This invention is illustrated in the accompanying drawing, wherein:

Figure 1 is a perspective view of the pail. Fig. 2 is a side elevation showing the strainer before being inserted in the spout. Fig. 3 is a sectional view through the spout with the strainer in place. Fig. 4 is a sectional view showing a second method of inserting the strainer in the spout.

Referring to the accompanying drawings, it will be seen that this invention comprises the pail 10 having the ears 11 with which the bail 12 is pivotally connected. A shield 13 partially covers the pail and carries a spout 14 which is preferably cylindrical in shape. A strainer is removably mounted in the spout, and comprises the collar 15, one side portion of which is provided with a cut-out portion 16. It should be noted that when the strainer is in place, the cut-out portion 16 is positioned at the front of the pail so that when pouring the milk out through the strainer, there will be no edge contacting with the forward edge of the spout. By forming this cut-out portion, the milk can, therefore, drain out, since it is not stopped by the edge of the collar. The strainer is provided with a mesh body portion 17, which is formed from resilient wire, and is provided with an enlarged lower portion 18. This enlarged portion 18 is compressed in inserting the strainer in the spout, thereby causing a binding engagement with the strainer and the spout, and causing the strainer to be firmly held in place. It should be noted that this strainer does not have to be compressed by any one inserting it in the spout, but that the operation of inserting it in the spout, of itself compresses the strainer, thereby causing it to enter the spout. If the strainer becomes compressed to such an extent that it does not fit tightly in the spout it may be placed upon a table or other object, and by compressing the wire mesh may be returned to the original shape so that it will again fit tightly in the spout. It will, therefore, be evident that there has been provided a strainer which will fit very tightly in place, thereby doing away with any danger of the strainer slipping out when pouring the milk out through the spout. A supporting handle 19 is provided so that the strainer may be removed when desired, and also permits the strainer to be hung upon a nail when the strainer is not in use. This handle has its side arms 20 passed through openings formed in the collar 15, and bent around the upper edge and inwardly to form the stops 21, which brace the handle, thereby permitting the strainer to be removed more easily. After this pail has been filled with milk, the strainer is inserted in the spout, with the handle at the forward edge of the pail. The milk is then poured out through the spout, thereby passing through the strainer, and any dirt which may have fallen into the pail is prevented from passing out of the spout by the strainer. The shield prevents the milk from flowing out of the pail without passing through the strainer, and the cut-out portion 16 of the collar prevents any of the milk from being held in the spout when the pail is drained. It will, therefore be evident that all of the milk passes out through the spout, and through the strainer. After the milk has all been poured out, the handle 19 is grasped and the strainer removed, and the strainer and pail can then be washed and put away until it is again desired to use the same. It is, of course understood that the strainer is kept at the milk-house and only inserted in the spout after the pail has been brought from the milking shed. It will, therefore, be evident that it is not necessary to provide one spout for each pail, since the same spout may be used for a number of pails.

From the foregoing description, it will be obvious that there has been provided a pail in which the strainer may be firmly but removably secured thereto, and which will thoroughly screen the milk but will not interfere with the milk being thoroughly drained out of the pail.

From an inspection of Fig. 4 it will be seen that the strainer may be inserted from the inner end of the spout instead of the outer end, if desired, thus having the strainer within the pail and eliminating any danger of the force of the stream of milk passing through the spout and washing the strainer loose. When used in this manner the stronger the stream of milk that is forced through the spout the tighter the strainer will be held in place since the collar 15 will form a sort of funnel for leading the milk into the spout. It should also be noted that when the strainer is placed in this position the cut-out portion 16 has a very marked advantage in that it prevents the collar 15 from stopping the flow of milk into the spout after the milk has been almost entirely poured out of the pail. When the milk is low in the pail the milk will run through the exposed portion of the mesh thereby permitting the pail to be entirely drained.

What is claimed is:—

1. A pail, a shield carried by said pail, a spout extending from said shield, a strainer removably mounted in said spout, said strainer having a fabric body portion, and a collar at the outer edge of the fabric body portion having one portion removed whereby the forward edge of the collar will be in spaced relation to the outer edge of the spout.

2. A pail, a shield carried by said pail, a spout extending from said shield, and a strainer removably mounted in said spout, said strainer comprising a fabric body portion formed of resilient material, a collar at the outer edge portion of said fabric body portion having its forward edge portion provided with a cut-out portion leaving the forward edge of the collar in spaced relation to the outer edge of the spout, and a handle connected with said collar whereby said strainer may be removed from said spout.

3. A pail, a shield at the upper edge of said pail, a spout extending from said shield, and a strainer adapted to be inserted in said spout, said strainer having a fabric body portion formed from resilient material, the body portion being enlarged at its inner end portion whereby the body portion of the strainer will be compressed when inserting the strainer in the spout, a collar at the outer edge portion of said strainer to limit the inward movement of the strainer, one portion of said collar being provided with a cut-out portion to hold the same in spaced relation to the edge of the spout, and a handle pivotally connected with said collar and provided with inwardly extending end portions to limit the pivotal movement of the handle.

4. A pail, a shield at the outer edge of said pail, a spout extending from said shield, and a strainer for said spout, said strainer comprising a fabric body portion formed of resilient material, said body portion converging toward its outer end, a collar at the outer end of said fabric body portion, and a handle carried by said collar.

In testimony whereof I hereunto affix my signature in presence of two witnesses.

BENJAMIN J. FREDERICK.

Witnesses:
 Jno. Conrad,
 J. D. Barr.

---

Copies of this patent may be obtained for five cents each, by addressing the "Commissioner of Patents, Washington, D. C."